A. McMILLAN.
TOOL HOLDER.
APPLICATION FILED JULY 18, 1918.
1,362,810.
Patented Dec. 21, 1920.
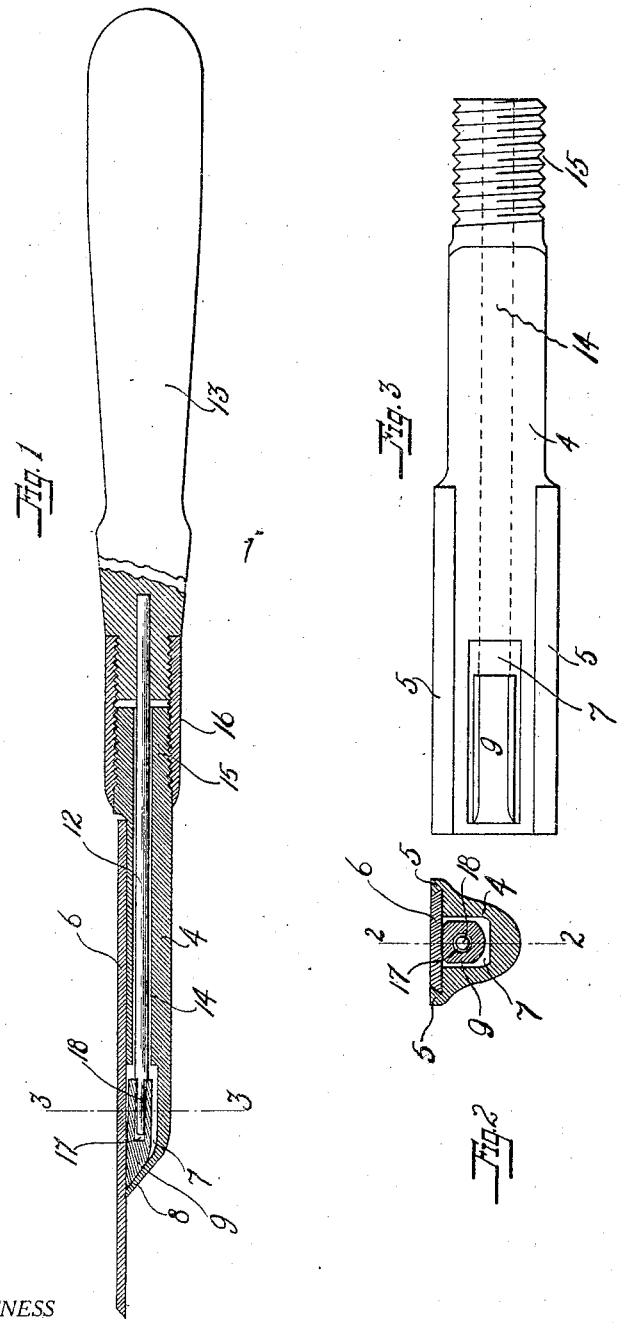
WITNESS
LeRoy Hanscom
INVENTOR
A. McMILLAN.
BY
White & Pint
his ATTORNEYS

UNITED STATES PATENT OFFICE.

ANGUS McMILLAN, OF SAN FRANCISCO, CALIFORNIA.

TOOL-HOLDER.

1,362,810.  Specification of Letters Patent.  Patented Dec. 21, 1920.

Application filed July 18, 1918. Serial No. 245,458.

*To all whom it may concern:*

Be it known that I, ANGUS MCMILLAN, a citizen of the United States, and a resident of the city and county of San Francisco and State of California, have invented a certain new and useful Tool-Holder, of which the following is a specification.

The invention relates to tool holders, and particularly to a device for holding tools which are to be manipulated by hand.

An object of the invention is to provide a tool holder, having a handle, which is rotatable to clamp or release the tool.

Another object of the invention is to provide a tool holder for wood working or similar tools which firmly clamps the tool and from which the tool may be quickly released.

The invention possesses other advantageous features, some of which, with the foregoing, will be set forth at length in the following description, where I shall outline in full, that form of the invention which I have selected for illustration in the drawings accompanying and forming part of the present specification. In said drawings I have shown one form of the tool holder of my invention, but it is to be understood that I do not limit myself to such form, since the invention, as set forth in said claims, may be embodied in a plurality of forms.

Referring to said drawings:

Figure 1 is a longitudinal section of the tool holder taken on the line 2—2, Fig. 2.

Fig. 2 is a cross section of the tool holder taken on the line 3—3, Fig. 1.

Fig. 3 is a top view of the body of the holder.

The tool holder of my invention comprises a metallic body 4 provided with overhanging shoulders 5, preferably parallel to each other, under which the blade or tool 6 is inserted. Formed in the body adjacent its forward end and between the shoulders is a seat or depression 7 having an upwardly-inclined forward wall 8. Arranged in the seat is a wedge 9, which is preferably provided with an inclined forward edge, and by pushing the wedge forward it is moved upward, firmly clamping the blade against the shoulders.

The wedge is moved to clamp or release the blade 6 by the rod 12 secured to the handle 13 and extending through the passage 14 in the body, and into engagement with the wedge. The body is provided on the end with a screw-threaded nipple 15 which is engaged by the screw-threaded socket 16 on the handle, so that as the handle is rotated, the rod is moved longitudinally. In order to prevent the wedge from falling from the seat when the blade is removed, means are provided for loosely holding it in place, in the present construction the wedge being loosely attached to the rod. This loose attachment is accomplished by forming a hole 17 in the wedge, into which an extension 18 on the rod extends, the hole being greater in diameter than the extension so that the wedge may rock slightly on the rod and the extension being of such length that in the normal operation of the holder the wedge may not become displaced. In operation, a half turn of the handle is usually sufficient to release or clamp the blade.

I claim:

1. A tool holder comprising a body, overhanging shoulders on said body under which a tool is insertible, a screw threaded nipple on said body, a handle, a screw threaded socket on said handle engaging said nipple, a wedge in said body arranged to engage said tool and a rod secured to the handle and engaging said wedge.

2. A tool holder comprising a body, overhanging shoulders on said body under which a tool is insertible, a seat in said body below said shoulders having an inclined end wall, a wedge in said seat, a handle in screw-threaded engagement with said body and being capable of rotary and longitudinal movement only with relation thereto, and means connecting the handle and the wedge whereby rotation of the handle produces a longitudinal movement of said wedge.

3. A tool holder comprising a body, overhanging shoulders on said body under which a tool is insertible, a seat in said body below said shoulders having an inclined end wall, a wedge in said seat, a handle in screw-threaded engagement with said body, a rod secured to said handle and engaging said wedge, and means connecting the rod and the wedge.

4. A tool holder comprising a body, overhanging shoulders on said body under which a tool is insertible, a seat in said body below said shoulders, a wedge in said seat having a hole therein, a handle in screw-threaded engagement with said body, and a rod secured to said handle so as to move longitudinally upon rotation of the handle and extending into the hole in the wedge.

In testimony whereof, I have hereunto set my hand at San Francisco, California, this 26th day of June, 1918.

ANGUS McMILLAN.

In presence of—
H. G. Prost.